United States Patent [19]
Kajiyama et al.

[11] 4,375,899
[45] Mar. 8, 1983

[54] PROTECTOR FOR MOVABLE PANEL OF ROOF STRUCTURE

[75] Inventors: Yasuo Kajiyama, Nishikawada; Kazuo Yokoyama, Mibu; Yoshihiro Yamakami, Ishibashi, all of Japan

[73] Assignee: Nissan Motor Company, Ltd., Yokohama, Japan

[21] Appl. No.: 224,909

[22] Filed: Jan. 14, 1981

[30] Foreign Application Priority Data

Jan. 21, 1980 [JP] Japan .................................. 55-4551

[51] Int. Cl.³ ............................................ B62D 25/06
[52] U.S. Cl. ................................. 296/213; 296/216; 296/222
[58] Field of Search ............... 296/216, 218, 213, 222; 114/201-203; 160/44; 49/476

[56] References Cited
U.S. PATENT DOCUMENTS 4,005,901  2/1977  Lutke et al. ........................ 296/218
4,229,037  10/1980  Vermeulin ........................ 296/216

FOREIGN PATENT DOCUMENTS 2137849  2/1973  Fed. Rep. of Germany ...... 296/222

Primary Examiner—Robert R. Song
Attorney, Agent, or Firm—Schwartz, Jeffery, Schwaab, Mack, Blumenthal & Koch

[57] ABSTRACT

A protector for a movable panel within a roof aperture is disclosed. In order to urge all of the rain drops and the like to drop into a water collecting channel fixed relative to the roof, the protector is formed with a downwardly extending lip which when the movable panel is in its closed position assumes a position above the center line of the water collecting channel.

6 Claims, 3 Drawing Figures

PROTECTOR FOR MOVABLE PANEL OF ROOF STRUCTURE

BACKGROUND OF THE INVENTION

1. Field of the Invention

The present invention relates to a protector mounted on the edge of a movable panel of an apertured roof of a vehicle, and more particularly to a protector for a movable panel disposed within a roof aperture to prevent the entry of rain drops and the like into the vehicle interior which tend to enter through a clearance formed between the edge of the movable panel and the adjacent edge of the roof aperture.

2. Description of the Prior Art

A prior proposed roof structure including a movable panel is shown in FIG. 1, wherein the movable panel 3 is mounted within an aperture 2 of a roof with its front edge detachably engaged with the front edge of the roof aperture by means of a hinge and with the rear edge attached to the rear edge of the roof aperture 2 by means of a lock. The movable panel 3 can be removed from the roof aperture 2 so that the roof aperture 2 is left open, when desired.

In this known roof structure, in order to prevent metal to metal contact of the edge of the movable panel 3 with the edge of the roof aperture and to provide a seal, a protector 4 is mounted on the edge of the movable panel. The protector 4 is provided with an integral sealing piece 5 adapted to selably contact with an upper surface of the roof 1 when the movable panel 3 is in its closed position.

The roof 1 is formed with a downwardly bending flange 6 from the edge of the roof aperture 2. Fixedly secured to the flange 6 is a frame F formed with a water collecting channel 7 and a seal rubber 8 is fixedly mounted to the inward edge of the water collecting channel 7 to sealably contact with the interior surface of the movable panel 3 when the movable panel 3 is in its closed position. According to this structure, rain drops 9 and the like having entered through a clearance between the sealing piece 5 and the roof 1 are collected in the water collecting channel 7 to be discharged to the vehicle exterior. The function of the seal rubber 8 is to prevent the rain drops and the like having been collected within the water collecting channel 7 from entering into the vehicle interior.

However, the structure using the known protector still allows the rain drops and the like having entered through the clearance formed between the mating surfaces of the sealing piece 5 and the roof 1 to flow inwardly along the lower surface of the protector 4 and the interior surface of the movable panel 3 to enter into the vehicle interior through a clearance formed between the interior surface of the movable panel 3 and the seal rubber 8. Besides, since the sealing piece 5 contacts directly with the roof 1 when the movable panel 3 is in its closed position, there is the possibility that the sealing piece 5 may damage or peel off the painting film on the surface of the roof. Where the movable panel 3 is happened to be pressed downwardly further from its the closing position, the sealing piece 5 may break from its root. Moreover, if the movable panel 3 is left outside for a long time under a hot day, the thermal deformation of the protector 4 is unavoidable.

SUMMARY OF THE INVENTION

According to the present invention, a protector has a lip extending downwardly therefrom to urge the rain drops and the like having entered through clearance formed between the movable panel and the roof to drop into the water collecting channel, thus preventing the entry of the rain drops and the like further into the vehicle interior.

DESCRIPTION OF THE PREFERRED EMBODIMENT

Figure 1:
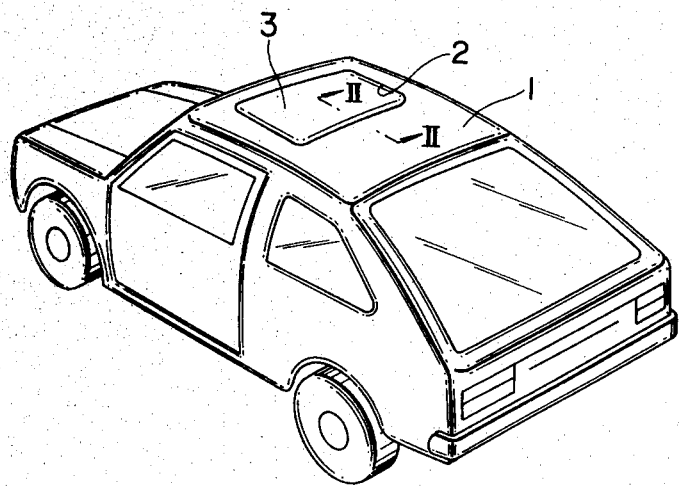
FIG. 1 is a perspective view of an automotive vehicle having an apertured roof with a movable panel for the roof aperture.
Figure 2:
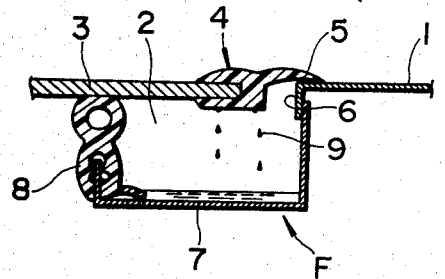
FIG. 2 is a section along II—II in FIG. 1 illustrating the prior art mentioned above.
Figure 3:
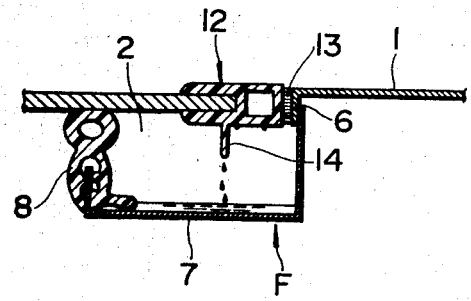
FIG. 3 is a similar section to FIG. 2 but illustrating a protector according to the present invention.

Referring to FIG. 3, a roof 1 has a downwardly bending flange 6 at the peripheral edge of an aperture 2. Secured to this flange 6 is a frame F defining a water collecting channel 7. At the free end or edge of this frame F, a seal rubber 8 is mounted which is adapted to contact with the interior surface of the movable panel 3 when the movable panel 3 is in its closed position so as to seal the vehicle interior.

The movable panel 3 is detachably mounted within the roof aperture 2 formed through the roof 1. Around the peripheral edge of the movable panel 3, a protector 12 is mounted to protect the peripheral edge of the movable panel 3. The protector 12 has on its outer circumferential wall a brush 13. The brush 13 is adapted to close the clearance between the edge of the protector 12 and the flange 6 so as to prevent the entry of rain drops and the like. The provision of the brush decreases the friction between the protector 12 and the flange 6 which otherwise would take place when the movable panel 3 is closed. The protector 12 has a lip 14 extending downwardly therefrom. The downwardly extending lip 14 is arranged such that when the movable panel 3 is in its closed position, it is disposed above the center line of the water collecting channel 7. The function of the lip 14 is to urge the rain drops and the like to drop into the water collecting channel 7, thus securing the dropping of the rain drops and the like into the water collecting channel 7.

Although in the above-mentioned embodiment, the movable panel of the detachable type has been taken as an example for the purpose of description, it is not intended to limit the invention to this. For example, the invention may be applied to the movable panel of the tiltable type or the sliding type.

With the construction mentioned as above, the rain drops and the like having entered through the clearance formed between the protector of the movable panel and the flange are urged or guided to drop into the water collecting channel by the downwardly extending lip. Thus, the possibility that the rain drops may enter the vehicle interior has been eliminated. Since the protector according to the present invention does not contact with the exterior surface of the roof, there is no possibility that the painting film of the roof is damaged or peeled off. Moreover, the possibility that the protector is defomed when the vehicle is under a hot day has been eliminated.

What is claimed is:

1. A roof structure for a vehicle, comprising:
   a roof having an aperture, and a flange secured to said roof and extending downwardly therefrom to define said aperture;
   a frame secured to said flange, said frame defining a water collecting channel extending along said flange;
   a movable panel mounted on said roof and connected for movement between an open position wherein said aperture is exposed, and a closed position wherein said panel covers said aperture, said panel having a peripheral edge;
   a protector mounted on said movable panel peripheral edge, said protector including a portion disposed facing said flange between said edge and said flange with a clearance therebetween when said movable panel is in its closed position, said protector including an integral downwardly extending lip spaced inwardly from said portion of said protector relative to said panel, said integral downwardly extending lip being disposed above said water collecting channel when said movable member is in its closed position.

2. A roof structure as claimed in claim 1, wherein said protector is provided on said portion thereof with a brush adapted to contact with said flange when said movable panel is in its closed position.

3. A roof structure as claimed in claim 1, wherein said downwardly extending lip is disposed above the center line of said water collecting channel when said movable panel is in the closed position.

4. A roof structure as set forth in claim 1, wherein said water collecting channel has an inner peripheral edge, and a seal member is connected to said inner peripheral edge, said seal member having an upper edge which contacts said movable panel when said movable panel is in the closed position.

5. A roof structure as set forth in claim 1, wherein said roof panel peripheral edge is disposed in the plane of said roof panel.

6. A roof structure as set forth in claim 1, wherein said roof panel has an upper surface facing away from said water collecting channel, and a lower surface facing toward said water collecting channel, and said protector has an upper portion engaging said upper surface, and a lower portion engaging said lower surface, said upper and lower portions being substantially parallel, and said downwardly extending lip being disposed substantially perpendicular to said lower portion.

* * * * *